United States Patent Office 3,429,828
Patented Feb. 25, 1969

3,429,828
PEPTIZING AND VISCOSITY STABILIZERS FOR ADHESIVES
Max H. Laden and Richard Shenfeld, Chicago, Ill., assignors to Swift & Company, Chicago, Ill., a corporation of Illinois
No Drawing. Filed Mar. 9, 1966, Ser. No. 532,885
U.S. Cl. 252—353
Int. Cl. C08f 25/02; C09j 3/06
10 Claims

ABSTRACT OF THE DISCLOSURE

Process of peptizing and stabilizing the viscosity of starch solutions and a composition for accomplishing the same comprising a liquefying salt in combination with an aromatic sulfonate.

---

The present invention relates to the treatment of starches, and more specifically, to an improved process for peptizing and stabilizing the viscosity of starches and to improved compositions for said use.

Native starch is insoluble in cold water but forms a colloidal solution in hot water (above the gelatinization temperatures). Upon cooling from a hot solution, native gelatinized starch tends to retrograde to a rigid gel or stiff paste upon aging. This paste possesses only limited adhesive properties and remains partly insoluble even upon re-heating. This phenomenon is commonly known as retrogradation or "paste-back," and is generally believed to be caused by precipitation of amylose from the starch solution on cooling. Retrogradation is most pronounced in starches of cereal grains such as corn, rice, wheat, etc., and to a somewhat lesser degree in starches of root materials such as tapioca, sweet potato, potato, etc., and to an even lesser extent in the waxy varieties of corn and sorghum starches which contain relatively little amylose.

Obviously, the tendency to retrograde limits, and in many instances negates, the usefulness of native starch solutions. For example, native starch is of little use as an adhesive because of the marked decrease in adhesive properties and the lack of tack after retrogradation.

Various peptizing agents have been added to native starches in an attempt to increase the tack and to counteract the tendency of said starches to retrograde. Commercially available liquefying salts such as sodium chloride, calcium chloride, urea, thiourea, dicyandiamide, etc., have been employed with limited effectiveness. Monoglycerides, polyoxyethylene oxide fatty acid esters, soaps, etc., have also been used but also with only limited effectiveness. Formaldehyde solutions are sometimes employed at a level of 2–3% of the starch slurry during the heating process to inhibit starch retrogradation. However, the strong residual odor and respiratory irritation of formaldehyde vapors prohibits the use of such formaldehyde inhibited starch adhesives for most purposes.

It is therefore an object of the present invention to provide improved compositions useful in the inhibition of retrogradation and viscosity stabilization of starches.

It is another object of the present invention to provide a process for inhibiting and stabilizing the viscosity of starches.

It is a further object of the present invention to provide a process for inhibiting starch retrogradation which may be employed using conventional equipment.

It is another object of the present invention to provide an improved starch composition which will possess an improved shelf life.

Other objects of the present invention, if not specifically set forth herein, will be obvious to one skilled in the art upon a reading of the following specification.

Surprisingly, it has been found that the treatment of starch solutions with certain cyclic sulfonates in combination with commercially available liquefying salts results in a marked increase in the stabilization of such solutions as opposed to the quite limited stability obtained when using these materials alone. In order to illustrate this synergistic effect, later examples will compare the relative degrees of stability obtained when using these compounds alone and in combination.

While there is increased stability obtained with all combinations of cyclic sulfonates and liquefying salts tested in comparison with the ingredients used alone, it has been noted that the cyclic sulfonates producing the greatest increase are the naphthalene sulfonates substantially free of carbon chain substitution. Other specific examples of applicable sulfonates, and their relative effectiveness, will be shown in later examples.

As heretofore mentioned, several liquefying salts having known starch stabilizing properties are commercially available at the present time. All of these salts are applicable to the present invention, as are other liquefying salts which will be readily apparent to one skilled in the art upon reading the present disclosure.

In general, a composition comprising one of the above-defined cyclic sulfonates or mixtures thereof in combination with any ratio of one or more of the above-defined liquefying salts results in some degree of synergism. However, it is preferred that the ratio of cyclic sulfonates to liquefying salt is from about 1:5 to about 5:1. Optimum results have bene obtained within the range of about 1:4 to about 1:3. These materials may be combined prior to processing of the starch or added separately during processing depending upon commercial preference.

As opposed to prior inhibiting compositions which have been limited primarily to dilute starch solutions, the present compositions are suitable for use in stabilizing highly concentrated solutions, as well as dilute solutions. Thus, the present compositions are useful in the stabilization of adhesive solutions, which are ordinarily formed from a starch solution containing about 10 to 40% starch, while most prior art compositions have almost negligible utility at such concentrations. In general, the present compositions may be used in treating aqueous solutions containing up to about 45% by weight starch.

Starch solutions are prepared by a process comprising: mixing starch, a cyclic sulfonate and a liquefying salt in an aqueous medium; heating the mixture thus formed to a temperature sufficient to effect solution of the components of said mixture; and cooling the solution thus formed.

The amount of heat necessary to effect solution in the above process necessarily varies depending on factors such as the type of starch and other components employed, and the relative percentages used. However, a temperature of a least 185° F. is generally employed. Also, in the above process, constant agitation is commonly employed concurrently with the cooling step in order to insure the formation of a uniform final solution.

The above process, contrary to many previous processes, has the additional advantage that no specialized equipment is required.

The ratio of the combined weight of the inhibiting composition to the weight of starch employed is generally from about 1:4.0 to about 1:2.5, and preferably from about 1:3.5 to about 1:3.0. These proportions are dependent to a degree, of course, on the type of starch, the ratio of ingredients within the inhibiting composition itself, and other factors.

It is to be understood that various additives may be combined with the starch compositions at any desired stage of the present process in order to impart additional desired properties to the starch compositions. Such additives include conventional defoamers and preservatives.

The following examples are presented as illustrative of the present compositions, their use and effectiveness, and are not to be construed as limiting the scope of the present invention.

EXAMPLE I

The ingredients shown in the following table were mixed in the percentages by weight shown in an open, steam-jacketed plain steel kettle with counter-rotating horizontal agitators. After mixing until a uniform lump-free slurry was obtained, the slurry was quickly heated to 185–195° F. and mixed for an additional 25–45 minutes. The resultant solution was then cooled to room temperature and drawn off.

The following table illustrates the synergistic viscosity stabilizing effect of a liquefying salt in combination with a cyclic sulfonate, i.e. sodium nitrate plus sodium alpha naphthalene sulfonate. The starch employed is a thin boiling waxy sorghum starch known by the designation Milo 6448.

TABLE I

| Sample | 1 | 2 | 3 | 4 |
|---|---|---|---|---|
| Water | 64.80 | 56.80 | 54.80 | 62.80 |
| Starch (Milo 6448) | 35.00 | 35.00 | 35.00 | 35.00 |
| Sodium Nitrate | | 8.00 | 8.00 | |
| Sodium Alpha Naphthalene Sulfonate | | | 2.00 | 2.00 |
| Preservative | .20 | .20 | .20 | .20 |
| | 100.00 | 100.00 | 100.00 | 100.00 |
| Viscosity, Poises: | | | | |
| Initially | 250 | 420 | 320 | 290 |
| After 24 hrs | 270 | 460 | 320 | 300 |
| After 1 week | 680 | 480 | 320 | 320 |
| After 1 month | (¹) | (²) | 330 | 800 |

¹ Hard gel.    ² Paste.

EXAMPLE II

The following table illustrates the relative properties of various cyclic sulfonates in combination with a liquefying salt, i.e. sodium nitrate. The samples were prepared by a procedure similar to that described in Example I.

TABLE II

| | | | | | | |
|---|---|---|---|---|---|---|
| Water, percent | 52.50 | 52.50 | 52.50 | 52.50 | 52.50 | 52.50 |
| Defoamer, percent | .10 | .10 | .10 | .10 | .10 | .10 |
| Milo starch, percent | 34.00 | 34.00 | 34.00 | 34.00 | 34.00 | 34.00 |
| Corn starch, percent | 3.00 | 3.00 | 3.00 | 3.00 | 3.00 | 3.00 |
| Sodium nitrate, percent | 8.00 | 8.00 | 8.00 | 8.00 | 8.00 | 8.00 |
| Preservatives, percent | .40 | .40 | .40 | .40 | .40 | .40 |
| Cyclic sulfonate, percent | 2.00 | (¹) | (²) | (³) | (⁴) | (⁵) |
| | 100.00 | 100.00 | 100.00 | 100.00 | 100.00 | 100.00 |
| Initial viscosity, poises | | 450 | 400 | 350 | 400 | 400 |
| After 3½ months, poises | | 750 | 600 | 500 | 650 | 900 |
| Water, percent | 52.50 | 52.50 | 52.50 | 52.50 | 52.50 | 52.50 |
| Defoamer, percent | .10 | .10 | .10 | .10 | .10 | .10 |
| Milo starch, percent | 34.00 | 34.00 | 34.00 | 34.00 | 34.00 | 34.00 |
| Corn starch, percent | 3.00 | 3.00 | 3.00 | 3.00 | 3.00 | 3.00 |
| Sodium nitrate, percent | 8.00 | 8.00 | 8.00 | 8.00 | 8.00 | 8.00 |
| Preservatives, percent | .40 | .40 | .40 | .40 | .40 | .40 |
| Cyclic sulfonate, percent | 2.00 | (⁶) | (⁷) | (⁸) | (⁹) | (¹⁰) | (¹¹) |
| | 100.00 | 100.00 | 100.00 | 100.00 | 100.00 | 100.00 |
| Initial viscosity, poises | | 360 | 300 | 370 | 380 | 400 | 370 |
| After 3½ months, poises | | 500 | 600 | 1,100 | 1,100 | 1,100 | 1,200 |

¹ Sodium-alpha-naphthalene sulfonate.
² Pilot STS-30 (sodium toluene sulfonate).
³ Petro AA (mono- and disodium salts or dimethyl naphthalene sulfonate).
⁴ Naxonate-SC (sodium-p-cymene sulfonate).
⁵ Naxonate-SB (sodium benzene sulfonate 95%).
⁶ Alkanol-S (sodium tetrahydro-naphthalene sulfonate).
⁷ Naccosol NRSF (sodium alkyl aryl sulfonate 95%).
⁸ Naccosol-A (sodium alkyl naphthalene sulfonate).
⁹ Solar 90 (sodium alkyl aryl sulfonate).
¹⁰ 1,5-naphthalene disulfonic acid.
¹¹ 2,7-naphthalene disulfonic acid.

Although some of the cyclic sulfonates shown in the above table are more effective than others, it is to be noted that none of the samples formed a hard gel or paste as did samples 1 and 2 in Table I.

EXAMPLE III

The following examples were prepared by a procedure similar to the above to illustrate the relative effectiveness of various liquefying salts in combination with sodium alpha naphthalene sulfonate.

TABLE III

| Sample, percent: | | | | | | | |
|---|---|---|---|---|---|---|---|
| Water | 54.80 | 54.80 | 54.80 | 54.80 | 54.80 | 54.80 | 54.80 |
| Milo Starch | 35.00 | 35.00 | 35.00 | 35.00 | 35.00 | 35.00 | 35.00 |
| Sodium Alpha naphthalene sulfonate | 2.00 | (¹) | (²) | (³) | (⁴) | (⁵) | (⁶) |
| Liquefying salt | 8.00 | 8.00 | 8.00 | 8.00 | 8.00 | 8.00 | 8.00 |
| Preservative | .20 | .20 | .20 | 2.0 | .20 | .20 | .20 |
| | 100.00 | 100.00 | 100.00 | 100.00 | 100.00 | 100.00 | 100.00 |
| Viscosity, poises: | | | | | | | |
| Initially | | 320 | 290 | 300 | 540 | 420 | 400 |
| After 24 hrs | | 320 | 300 | 320 | 540 | 420 | 500 |
| After 1 week | | 320 | 300 | 300 | 520 | 440 | 500 |
| After 1 month | | 330 | 310 | 310 | 800 | 500 | 480 |

¹ Sodium nitrate.    ⁴ Sodium chloride.
² Ammonium nitrate.    ⁵ Calcium chloride.
³ Calcium nitrate.    ⁶ Potassium nitrate.

EXAMPLE IV

The following samples were prepared by a procedure similar to the above and illustrate the relative effectiveness of various liquefying salts with various cyclic sulfonates.

TABLE IV

| | | | | | | |
|---|---|---|---|---|---|---|
| Water, percent | 52.70 | 52.70 | 52.70 | 52.70 | 52.70 | 52.70 |
| Defoamer, percent | .10 | .10 | .10 | .10 | .10 | .10 |
| Nitrate, percent | 8.00 | (1) | (2) | (3) | (4) | (1) |
| Sulfonate, percent | 2.00 | (a) | (b) | (c) | (d) | (e) |
| Milo Starch, percent | 34.00 | 34.00 | 34.00 | 34.00 | 34.00 | 34.00 |
| Corn Starch, percent | 3.00 | 3.00 | 3.00 | 3.00 | 3.00 | 3.00 |
| Preservative, percent | .20 | .20 | .20 | .20 | .20 | .20 |
| | 100.00 | 100.00 | 100.00 | 100.00 | 100.00 | 100.00 |
| Viscosity, poises: | | | | | | |
| Initially | | 490 | 400 | 400 | 400 | 730 |
| After 4 days | | 500 | 520 | 480 | 500 | 680 |
| After 1 month | | 600 | 540 | 450 | 480 | 700 |

1 Sodium nitrate.
2 Calcium nitrate.
3 Ammonium nitrate.
4 Potassium nitrate.
a Sodium alpha naphthalene sulfonate.
b Mono- and disodium dimethylnaphthalene sulfonate.
c Sodium benzene sulfonate.
d Sodium-p-cymene sulfonate.
e 1,5-naphthalene disulfonic acid.

EXAMPLE V

The following table further illustrates the synergistic properties of certain liquefying salts in combination with certain cyclic sulfonates.

TABLE V

| Sample No | 1 | 2 | 3 | 4 | 5 | 6 |
|---|---|---|---|---|---|---|
| Water, percent | 2.50 | 52.50 | 52.50 | 52.50 | 52.50 | 52.50 |
| Pluronic L-61 (Polyoxyalkylene ether), percent | .10 | .10 | .10 | .10 | .10 | .10 |
| Milo Starch 6448, percent | 34.00 | 34.00 | 34.00 | 34.00 | 34.00 | 34.00 |
| Douglas Crown St. XR (Thin Boiling Corn Starch), percent | 3.00 | 3.00 | 3.00 | 3.00 | 3.00 | 3.00 |
| Sodium Nitrate, percent | 10.00 | | | | 5.00 | 5.00 |
| Sodium Alpha-Naphthalene Sulfonate, percent | | 10.00 | | | 5.00 | |
| Petro AA (Mono- and Disodium Salts of Dimethyl Naphthalene-Sulfonate), percent | | | 10.00 | | | 5.00 |
| Naxonate SB (Sodium Benzene Sulfonate 95%), percent | | | | 10.00 | | |
| Dowicide CO (Ortho Phenyl Phenol), percent | .40 | .40 | .40 | .40 | .40 | .40 |
| | 100.00 | 100.00 | 100.00 | 100.00 | 100.00 | 100.00 |
| Initial Viscosity, percent | 600 | 460 | 300 | 390 | 410 | 230 |
| After 24 hrs., poises | 600 | 490 | 300 | 420 | 410 | 230 |
| After 1 week, poises | 710 | 550 | 330 | 440 | | |
| After 23 days, poises | 740 | 580 | 350 | 470 | 450 | 250 |
| Percent Viscosity Increase | 23.33 | 26.09 | 16.66 | 20.51 | 9.75 | 8.69 |

Obviously many modifications and variations of the invention as hereinbefore set forth may be made without departing from the spirit and scope thereof, and therefore only such limitations should be imposed as are indicated in the appended claims.

We claim:

1. A peptizing and viscosity stabilizer for starches comprising: a liquefying salt and an aromatic sulfonate combined in a weight to weight ratio of from about 1:5 to about 5:1.

2. The composition of claim 1, wherein said aromatic sulfonate is selected from the group consisting of aromatic sulfonates, and alkyl substituted derivatives thereof.

3. The composition of claim 1, wherein said aromatic sulfonate is a naphthalene sulfonate substantially free of carbon chain substitution.

4. The composition of claim 1, wherein said liquefying salt is selected from the group consisting of the nitrates and chlorides of sodium, ammonia, calcium and potassium.

5. A process for peptizing starch solutions and stabilizing the viscosity thereof comprising: forming an aqueous mixture of starch, a liquefying salt and an aromatic sulfonate, said liquefying salt and aromatic sulfonate combined in a weight to weight ratio of from about 1:5 to about 5:1, and heating the mixture thus formed to a temperature sufficient to form a uniform solution.

6. The process of claim 5, wherein said liquefying salt and said aromatic sulfonate are combined in a weight to weight ratio of from about 1:4 to about 1:1.

7. The process of claim 5, wherein said aromatic sulfonate is selected from the group consisting of aromatic sulfonates, and alkyl substituted derivatives thereof.

8. The process of claim 5, wherein said liquefying salt is selected from the group consisting of the nitrates and chlorides of sodium, ammonia, calcium and potassium.

9. The process of claim 5, wherein said mixture is further mixed during said heating.

10. A composition of matter comprising an aqueous mixture of starch in combination with a liquefying salt and an aromatic sulfonate, said liquefying salt and aromatic sulfonate combined in a weight to weight ratio of from about 1:5 to about 5:1.

References Cited

UNITED STATES PATENTS

| | | | |
|---|---|---|---|
| 3,332,795 | 7/1967 | Black et al. | 106—210 |
| 3,222,199 | 12/1965 | Hickey | 106—213 |
| 2,735,821 | 2/1956 | Gaver | 252—188.2 |

JAMES A. SEIDLECK, *Primary Examiner.*
R. W. MULCAHY, *Assistant Examiner.*

U.S. Cl. X.R.
106—213